US009033788B2

(12) United States Patent
George et al.

(10) Patent No.: US 9,033,788 B2
(45) Date of Patent: May 19, 2015

(54) ENTERTAINMENT MANAGEMENT SYSTEM WITH MULTI-LINGUAL SUPPORT

(75) Inventors: Jeffrey George, Las Vegas, NV (US); Martin Dempsey, Las Vegas, NV (US); Edward Sepich, IV, Henderson, NV (US); Thomas E. Soukup, Las Vegas, NV (US)

(73) Assignee: Konami Gaming, Inc., Las Vegas, NV (US)

( * ) Notice: Subject to any disclaimer, the term of this patent is extended or adjusted under 35 U.S.C. 154(b) by 1434 days.

(21) Appl. No.: 11/214,358

(22) Filed: Aug. 29, 2005

(65) Prior Publication Data

US 2006/0009282 A1 Jan. 12, 2006

Related U.S. Application Data

(63) Continuation-in-part of application No. 11/094,605, filed on Mar. 30, 2005, now Pat. No. 7,303,475, which is a continuation of application No. 09/967,571, filed on Sep. 28, 2001, now abandoned.

(60) Provisional application No. 60/608,519, filed on Sep. 9, 2004.

(51) Int. Cl.
*A63F 13/216* (2014.01)
*G07F 17/32* (2006.01)

(52) U.S. Cl.
CPC ............ *G07F 17/32* (2013.01); *G07F 17/3227* (2013.01); *G07F 17/3234* (2013.01); *G07F 17/3237* (2013.01); *G07F 17/3239* (2013.01)

(58) Field of Classification Search
CPC ............ G07F 17/3227; G07F 17/3239; A63F 2300/00; A63F 2300/1072; A63F 2300/208; A63F 2300/303; A63F 2300/535; A63F 2300/5533; A63F 2300/1075; A63F 2300/55335
USPC ............................................ 463/42, 1.42, 25
See application file for complete search history.

(56) References Cited

U.S. PATENT DOCUMENTS

| | | | | |
|---|---|---|---|---|
| 6,110,041 | A | 8/2000 | Walker et al. | |
| 6,293,866 | B1 | 9/2001 | Walker et al. | |
| 6,722,985 | B2 * | 4/2004 | Criss-Puszkiewicz et al. | 463/29 |
| 6,896,618 | B2 | 5/2005 | Benoy et al. | |
| 7,927,211 | B2 * | 4/2011 | Rowe et al. | 463/29 |
| 2002/0151366 | A1 | 10/2002 | Walker et al. | |
| 2002/0152120 | A1 | 10/2002 | Howington | |
| 2003/0054868 | A1 * | 3/2003 | Paulsen et al. | 463/1 |
| 2003/0078101 | A1 * | 4/2003 | Schneider et al. | 463/42 |
| 2003/0148812 | A1 | 8/2003 | Paulsen et al. | |
| 2004/0242324 | A9 | 12/2004 | Walker et al. | |
| 2005/0143169 | A1 | 6/2005 | Nguyen et al. | |

* cited by examiner

*Primary Examiner* — Damon Pierce
*Assistant Examiner* — Jeffrey Wong
(74) *Attorney, Agent, or Firm* — Howard & Howard Attorneys PLLC

(57) ABSTRACT

A system and method manages an electronic gaming environment. The gaming environment includes at least one gaming device. The system includes a database and a computer coupled to the database. The database stores system and user account data for at least one user and establishes a default language for the system. The computer is networked to the device. A user interface, associated with either the computer or the gaming device identifies a user, interacts with the user, and provides access to the system as a function of the identity of the user. The user interface is displayed in (a) in a preferred language of the identified user or (b) in the default language of the system if no preferred language is specified.

24 Claims, 7 Drawing Sheets

ENTERTAINMENT MANAGEMENT SYSTEM WITH MULTI-LINGUAL SUPPORT

CROSS-REFERENCE TO RELATED APPLICATIONS

The present application claims priority to U.S. Provisional Application Ser. No. 60/608,519 filed Sep. 9, 2004 and is a continuation-in-part application of U.S. patent application Ser. No. 11/094,605 filed on Mar. 30, 2005, which is a continuation of application Ser. No. 09/967,571, filed Sep. 28, 2001 (now abandoned), all of which are hereby incorporated by reference.

FIELD OF THE INVENTION

The present invention relates generally to gaming machines, and more particularly, to a system and method for providing a user interface to a user of the system.

BACKGROUND OF THE INVENTION

The growth and competition in the casino gaming market in recent years and the increasingly sophisticated and complex technology being integrated into the gaming environment, at the individual game, casino management, and auditing levels, presents both challenges and opportunities to game manufacturers, gaming establishment operators, and regulatory agencies. The technological capabilities and requirements of, for example, advanced electronic games, multi-site gaming operations, detailed player tracking, wide area progressive jackpots, and various alternatives to the use of currency and coins by players, all present a potentially huge pool of ever-changing data which can be of great value to casino operators (from a management standpoint) and to regulators from an audit/compliance standpoint.

One area that has received a lot of attention in recent years has been providing added bonuses or incentives to players of electronic gaming machines, such as video slot machines video poker machines. An award may be selected at random or be based on a player's previous level of play. Once a player has met the selected criteria, the award in credits paid from the machine's hopper is released.

Players may also be given an incentive through a player tracking club. Usually, a player is identified during play by a player tracking ID card and/or a player identification number (PIN). The player tracking system tracks the player's play and awards player tracking points according to established criteria. The player tracking points may be redeemed for prizes, such as complimentary meals or merchandise.

Typically, the player track ID card is entered into a player ID card located on the electronic gaming machine. A separate, numeric key pad is used to enter the PIN. Furthermore, a separate display screen may be used to display information or instructions to the player.

However, standard systems are inflexible and do not provide the casino operator with the maximum benefit and advantages available from the information and systems now available.

The present invention is aimed at one or more of the problems as set forth above.

SUMMARY OF THE INVENTION

In a first aspect of the present invention, a system for managing an electronic gaming environment including at least one gaming device is provided. The system includes a user interface, a database, and a computer. The user interface identifies a user, interacts with the user, and provides access to the system as a function of the identity of the user. The database stores system and user account data for at least one user and includes a default language for the system. The computer is coupled to the database and networked to the device corresponding to each gaming machine. The user interface is displayed (a) in a preferred language of the identified user or (b) in the default language of the system if no preferred language is specified.

In a second aspect of the present invention, a method for managing an electronic gaming environment having at least one gaming device is provided. The method includes the steps of establishing a default language for the electronic gaming environment, identifying a user of the at least one gaming device, and providing a user interface for interaction with the user. The user interface is displayed in (a) in a preferred language of the identified user or (b) in the default language of the system if no preferred language is specified.

In a third aspect of the present invention, a system for managing an electronic gaming environment including at least one gaming device is provided. The system includes a database, a computer, and a user interface. The database stores system and user account data for at least one user and includes a default language for the system. The computer is coupled to the database and networked to the device corresponding to each gaming machine. The user interface identifies a user, interacts with the user, and provides access to the system as a function of the identity of the user. The user interface is displayed (a) in a preferred language of the identified user or (b) in the default language of the system if no preferred language is specified.

In a fourth aspect of the present invention, a method for managing an electronic gaming environment having at least one gaming device is provided. The method includes the steps of establishing a default language for the electronic gaming environment, identifying a user of the system, and providing a user interface for interaction with the user. The user interface is displayed (a) in a preferred language of the identified user or (b) in the default language of the system if no preferred language is specified.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE INVENTION

Figure 1A:
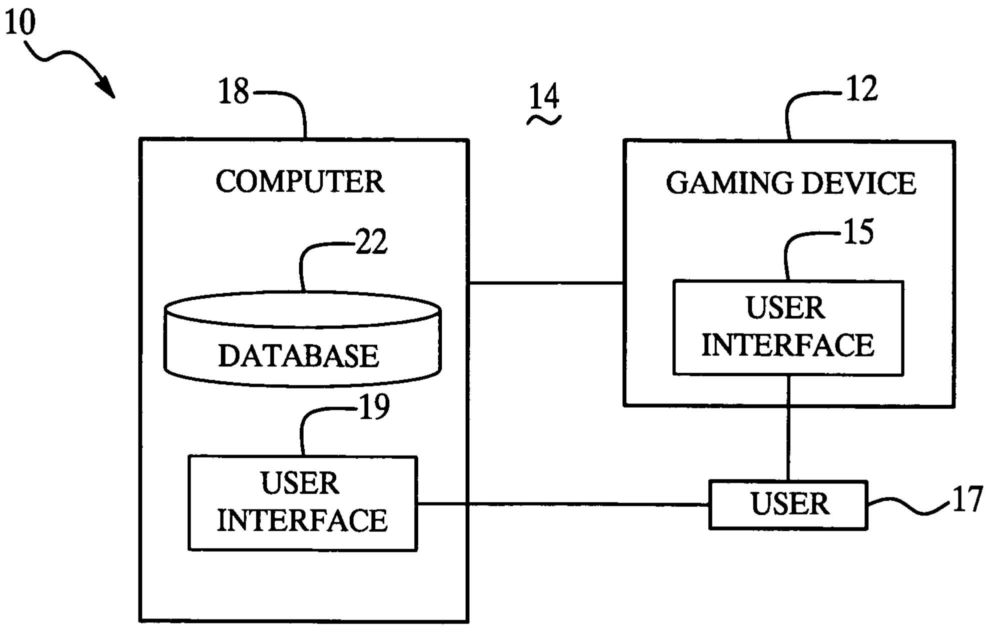
FIG. 1A is a simplified block diagram of a system for providing a user interface to a user of a gaming device in a gaming environment, according to an embodiment of the present invention.

With reference to the drawings and in operation, the present invention provides a system (or entertainment management and monitoring system) 10 and method with multi-lingual support for user(s) 17 in a gaming environment 14.

As shown, each gaming device 12 has an associated user interface 15, which is used to identify the user 17, interacting with the user 17, and providing access to the system 10 as a function of the identity of the user 17.

The at least one gaming device 12 is coupled to a computer 18 with an associated database 22. In one embodiment, the gaming device 12 is coupled to the computer 18 via a network 16 (see below). The database 22 stores system and user account data for at the users of the system least one user. The database 22 may be stored on the computer 18 or on another computer or workstation (not shown) and accessible by the computer 18.

In one aspect of the present invention, the database 22 includes a default language for the system 10. The default language of the system 10 can be established or changed by a predetermined user 17 of the system using the user interface 15. For example, users 17 of the system are given access to different parts and/or functions of the system 10, which is generally established and stored as user account data in the database 22.

In another aspect of the present invention, the user interface 15 is displayed in a preferred language of the identified user 17 or in the default language of the system 10 if no preferred language is specified.

The preferred language of each user 17 may be specified in the user data stored in the database 22 for each user 17. Typically, the user data for each user 17 is stored in a user record. When the user record is created or modified, the preferred language for that user may be established or modified. In one embodiment, the default preferred language may be set initially to the default language of the system 10.

In one embodiment, the computer 18 allows a predetermined user (based on the access to the system 10 as defined by their user data) to set the default language for the system and/or the preferred language for other users.

As discussed below, in one embodiment, the gaming device 12 may be a gaming machine 13 (see FIG. 1B). Users 17, i.e., players 24, are allowed to place wagers on a game played on the gamine machine 13. The gaming machine 13 may also allow the players 24 to access the system 10 for other purposes.

In one embodiment, the gamine machine 13 is an electronic gaming machine, such as a video slot machine or video poker machine. As discussed more fully below, the gaming machine may include a player interface or tracking device 38. The user interface 15 may be implemented on the player tracking device 38. In this embodiment, the user interface 15 allows the player 24 to access certain portions of their user data, such as bonus or advanced incentives points (see below).

The user interface 15 on the player tracking device 38 may also be used by employees of the casino to perform certain functions, such as maintenance, hopper fills, etc. . . . .

As discussed below, the gaming device 12 may also be a remote device (see below), which are typically for use by employee users 17 for performing user-specific functions (see below).

Another user interface 19 which may be associated with the computer 18, allows employee users 17 to perform system functions (see below). The user interface 19 may be implemented on the computer 18 or another device (not shown) coupled or networked to the computer 18, such as a workstation (not shown).

In one aspect of the present invention, the user interfaces 15, 17 is used to identify a user (through reading of an ID card and/or entry of a user name and password or identification number), interacting with the user, and providing access to the system as a function of the identity of the user.

Gaming machines 12, 13 may include, but are note limited to electronic gaming machines or EGM (such as video slot, video poker machines, or video arcade games), electric gaming machines, virtual gaming machines, e.g., for online gaming, and an interface to a table management system (not shown) for table games.

Figure 1B:
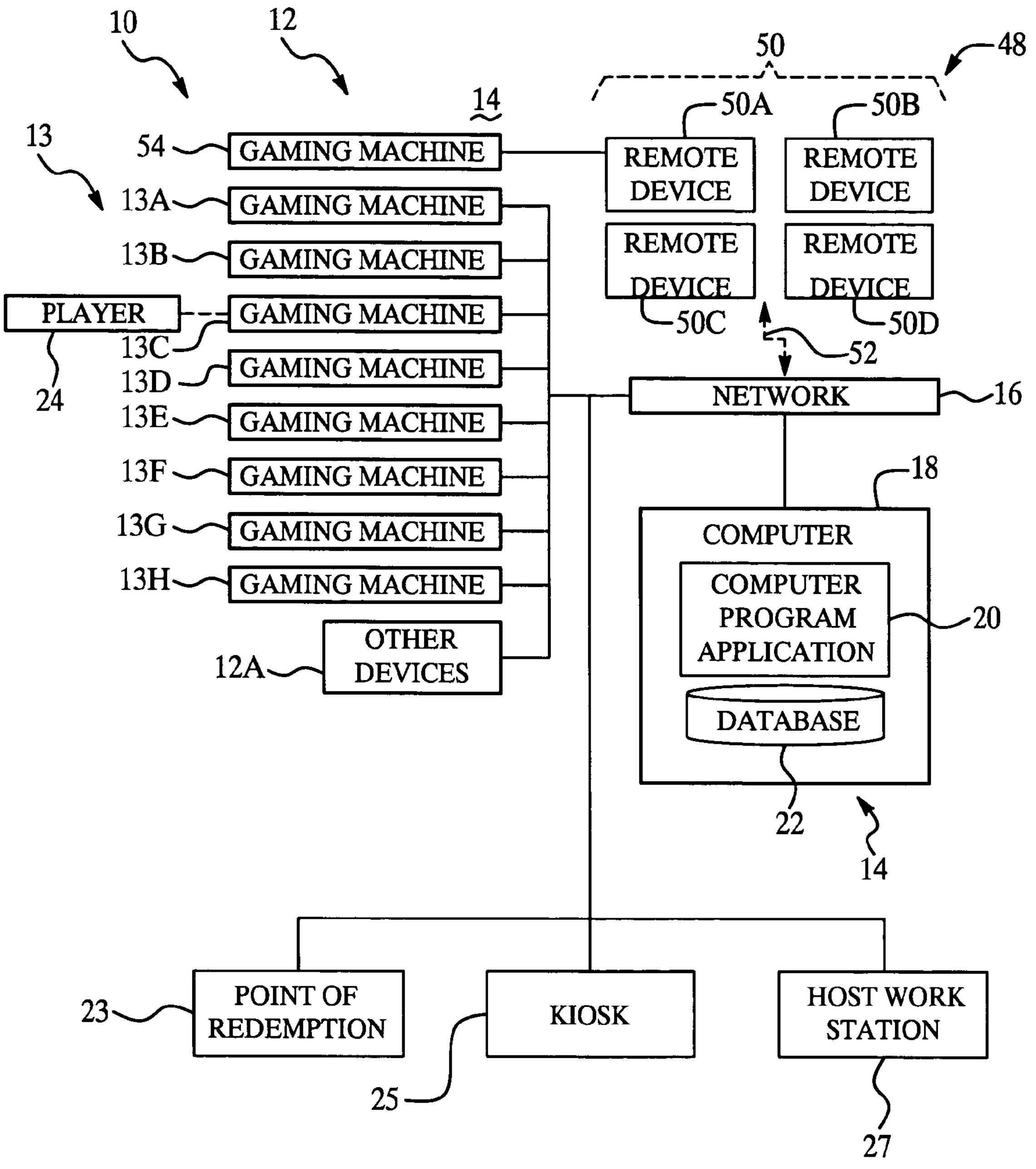
FIG. 1B is a second diagram of the system of FIG. 1B, according to an embodiment of the present invention.

An exemplary entertainment management and monitoring system 14 is shown in block diagram form in FIG. 1. The entertainment and monitoring system 14 may include may additional functions such as, real-time multi-site, slot accounting, player tracking, cage credit and vault, sports book data collection, Point of Sale (POS) accounting, keno accounting, bingo accounting, and table game accounting, a wide area progressive jackpot, and electronic funds transfer (EFT). Such systems are disclosed in U.S. patent application Ser. No. 11/094,605 filed Mar. 30, 2004, which is a continuation of U.S. patent application Ser. No. 09/967,571. filed Sep. 28, 2001 and U.S. Provisional Application Ser. No. 60/608,519 filed Sep. 9, 2004, both of which are hereby incorporated by reference.

As shown, the system 10 may include a plurality of gaming machines 13. In the illustrated embodiment, eight electronic gaming machines 13A-13H are shown. However, it should be noted that the present invention is not limited to any number or type of machines 12. In one embodiment, the machines 12, 13 are organized into banks (not shown), each bank containing a plurality of machines 12, 13. Other types of gaming machines which may be included (see above) are indicated with reference number 13A.

The gaming machines 12 are connected via a network 16 to one or more host computers 18, which are generally located at a remote or central location. The computer 18 includes a computer program application 20 which maintains one or more databases 22. In one embodiment, the database(s) are Oracle database(s).

The computer program application 20 and databases 22 may be used to record, track, and report accounting information regarding the gaming machines 12, 13 and players or patrons 24 of the gaming machines 12. Additionally, the computer program application 20 and databases 22 may be used to maintain information related to player tracking accounts (see below).

In general, the gaming machines 13 are playable by the player 24. The player 24 may select one of the gaming machines 13 to play and insert a coin, credit, coupon, and/or player tracking card (not shown) into the chosen gaming machine 13. Generally, the gaming machines 13 have an associated number of credits or coins required in order to play. In the case of video slot or poker games, the game is played and an award in the form of credits may be awarded based on a pay table of the gaming machine 13.

Figure 2:
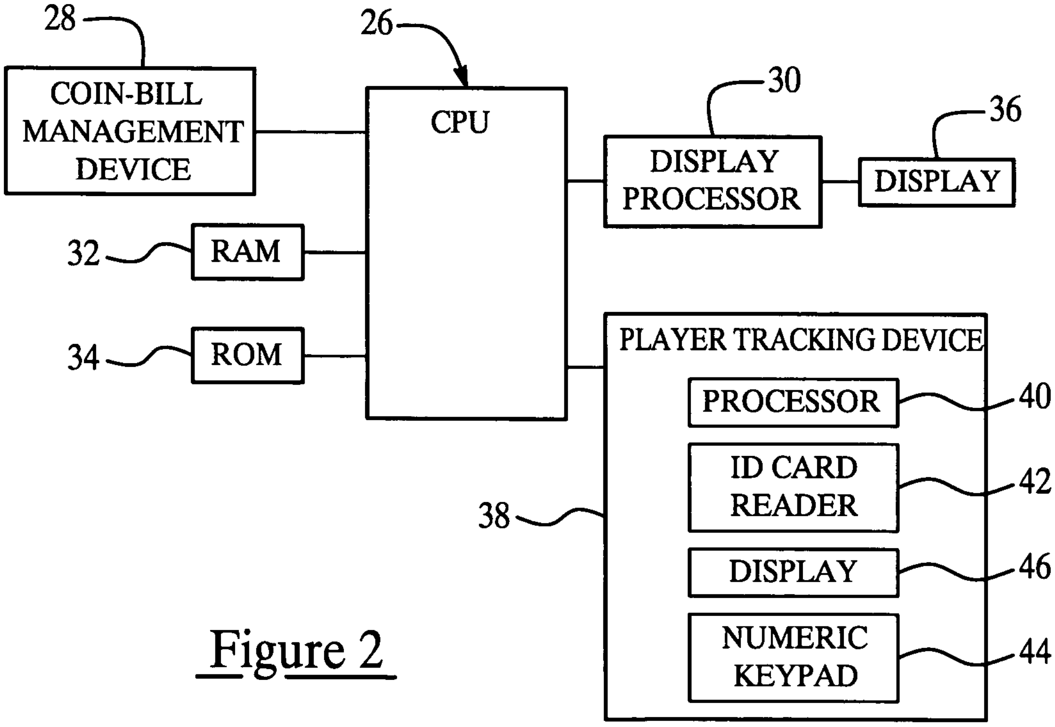
FIG. 2 is a block diagram of a gaming machine for use with the system of FIG. 1.

With reference to FIG. 2, a block diagram of a suitable electronic gaming machine 12 is shown.

The machine 12 comprises a game controller 26, or central processing unit (CPU), a coin-bill management device 28, a display processor 30, a RAM 32 as a memory device and a ROM 34 (generally provided as an EPROM). The CPU 26 is mainly composed of a microprocessor unit and performs various calculations and motion control necessary for the progress of the game. The coin-bill management device 28 detects the insertion of a coin or a bill and performs a necessary process for managing the coin and the bill. The display processor 30 interprets commands issued from the CPU 26 and displays desirable images on a display 36. The RAM 32 temporarily stores programs and data necessary for the progress of the game, and the ROM 34 stores, in advance, programs and data for controlling basic operation of the machine 12C, such as the booting operation thereof, game code and graphics.

Input to the gaming machine 13 may be accomplished via mechanical switches or buttons or via a touchscreen interface (not shown). Such gaming machines 13 are well known in the art and are therefore not further discussed.

The player 24 is identified via the player tracking card and/or a player identification number entered into player tracking device 38 at each gaming machine 13 (see below). Player tracking accounts may be used, generally, to provide bonuses to a player, in addition to the award designated by, in the case of a video slot or poker machine, the gaming machine's 13 paytable. These bonuses may be awarded to the player 24 based a set of criteria, including, but not limited to, a) the player's play on the machine 12C, b) the player's overall play, c) play during a predetermined period of time, and d) the player's birthday or anniversary, or e) any other definable criteria. Additionally, bonuses may be awarded on a random basis, i.e., to a randomly chosen player or randomly chosen game 12. Bonuses may also be awarded in a discretionary manner or based on other criteria, such as, purchases made at a gift shop or other affiliated location.

In one embodiment, the player tracking device 38 includes a processor 40, a player identification card reader 42 and/or a numeric keypad 44, and a display 46. In one embodiment, the display 46 is a touchscreen panel and the numeric keypad 44 is implemented thereon.

The player 24 may be identified by entry of a player tracking card into the player identification card reader 42 and/or entry of a player identification number (PIN) on the numeric key pad 46. The play tracking device 38 may also be used to communicate information between the computer 18 and the corresponding gaming machine 12C. The player tracking device 40 may also be used to track bonus points, i.e., incentive points or credits, downloaded from the computer 18.

One such system for awarding bonuses in a gaming environment is disclosed in U.S. patent application Ser. No. 10/661,198, filed on Sep. 12, 2003, which is hereby incorporated by reference.

With reference to FIG. 2, in one aspect of the present invention, the player tracking device 38 provides an interface for interaction between the player or patron 24 or other user (not shown), such as a slot employee or slot technician, and the host computer 18, i.e., the player tracking system. As discussed above in one embodiment, the display 44 is a touchscreen display which allows information to be displayed to the player 24 or user, as well as provide interactive buttons or menus for receiving input. Furthermore, the keypad 46 may be implemented on the display 46 and displayed on the display 44 as appropriate or required.

In one aspect of the present invention, the display 44 displays a bezel which may be used to display or convey other information.

If the game machine 13 is not currently being played, the processor 40 may instruct the display 44 to display instructions for inserting a player ID Card into the ID card reader 42. Additionally, the display may other media, e.g., audio and/or video and/or pictures, in a cyclical manner.

The types of media that may be displayed on the player tracking device 38 include, but are not limited to local attractions, general in-house advertisements, paid advertisements by local merchants, show reviews, promotional alerts, security alerts, community service advisories, emergency directions, featured videos, a current Keno board.

Figure 3A:
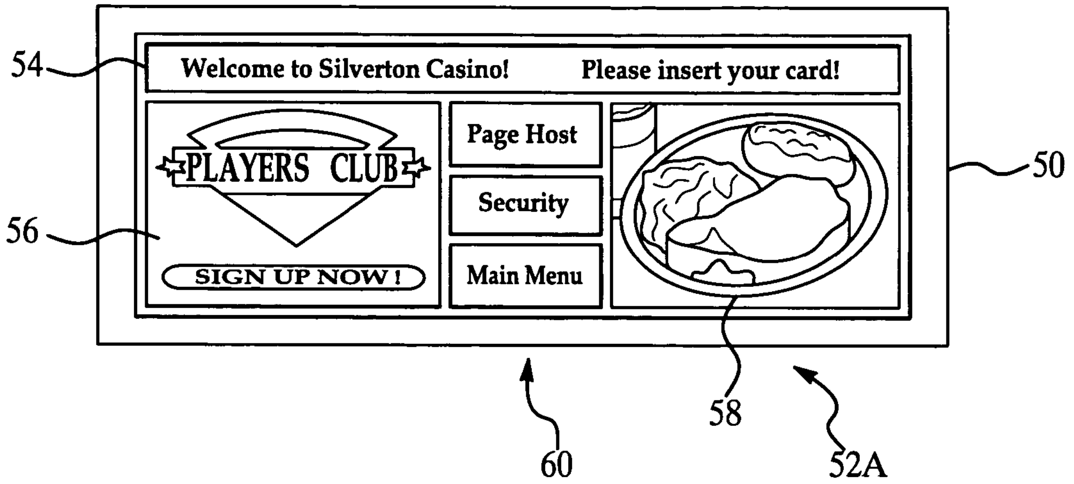
FIG. 3A is a diagrammatic illustration of a user interface, according to an embodiment of the present invention.

With specific reference to FIG. 3A, a first sample screen image 52A is shown. The screen image 52A is shown within the bezel 50 and includes a title bar 54 with instructions to "insert your card", a player's club welcome image 56, an advertising media 58, and a plurality of buttons 60.

The player's club welcome image 56 may be player selectable which may cause the player tracking device 38 to display a screen or series of screens for allowing the player to enroll in the player tracking system. Alternatively, selection of the player's club welcome image may page a host (not shown) who could enroll the player in the player tracking club. The host may be enroll the player using a remote device (not shown).

The advertising media 58 may include an image and/or (live or streaming) video and/or audio media.

Figure 3B:
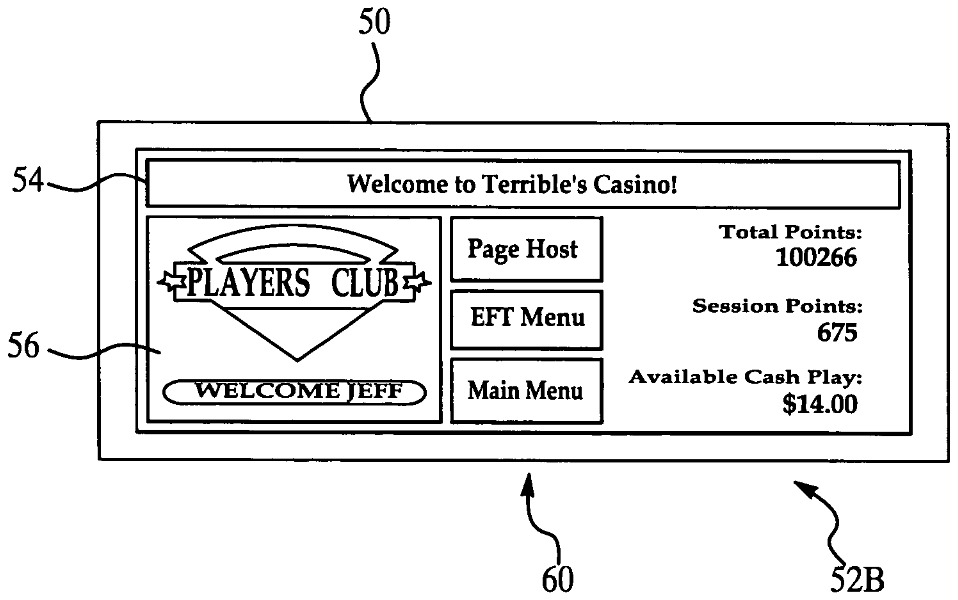
FIG. 3B is a diagrammatic illustration of a user interface, according to an embodiment of the present invention.

The buttons 60 allow the player 24 to interact with the host computer 18. For example as shown in FIGS. 3A and 3B, buttons maybe provided which allow the player 24 to page a host (a slot host or a drink hostess), page security (or security employee), or to navigate to a main menu (not shown).

In another aspect of the present invention, the player tracking device 38 allows the player 24 to interact with the player tracking system to view information and to interact with the player's account. For example with specific reference to FIG. 3B, once the player 24 has been identified to the player tracking system, the display may a bonus point total, a session bonus point total, and an available cash play.

Furthermore, as discussed above, the player tracking device 38 may display a list of vouchers assigned to the player 24. The player 24 may be allowed to select a voucher to download.

In another aspect of the present invention, the player tracking device 38 allows the player 24 to send and receive messages to a spouse, friend, or slot employee. The messages may be text and/or video and/or audio messages.

In another aspect of the present invention, the player tracking device 38 allows the player 24 to conference call a spouse, friend, or slot employee. The conference call may be text and/or video and/or audio messages.

In another embodiment, the, the media containing a machine glossary of terms.

In still another embodiment, the media may include a live video feed from a selected security camera.

Figure 3C:
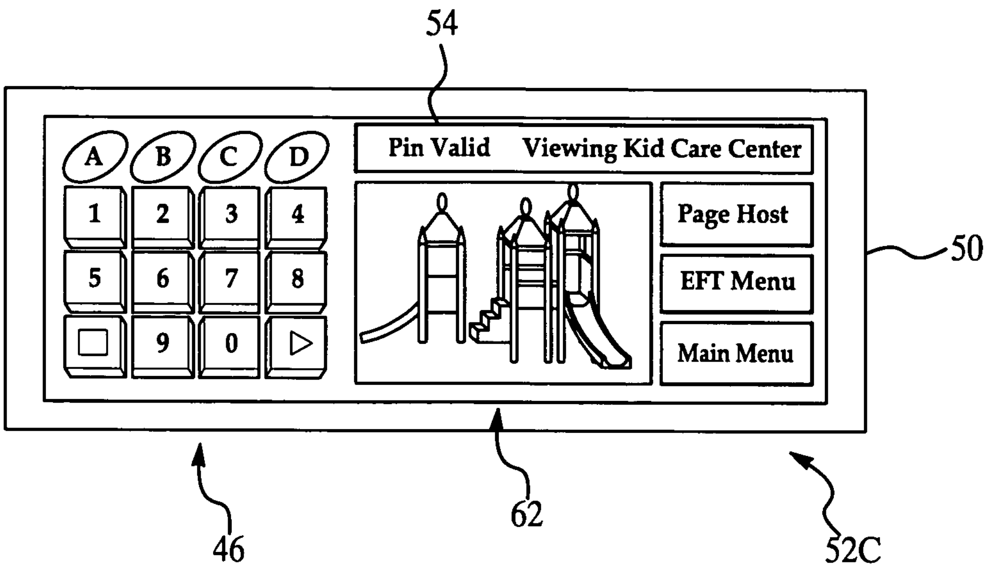
FIG. 3C is a diagrammatic illustration of a user interface, according to an embodiment of the present invention.

With specific reference to FIG. 3C, in still another embodiment, the player tracking device 38 may provide a live video feed 62 of a remote location (not shown). For example, the remote location may be a childcare facility at which a child of the player 24 may be enrolled. In one embodiment, the player tracking device 38 for confirms that a child of the player 24 is enrolled at the child care facility through a personal identification number (PIN). If the PIN entered on the numeric or alpha-numeric keypad 46 is valid, the live feed 62 is displayed.

Figure 3D:
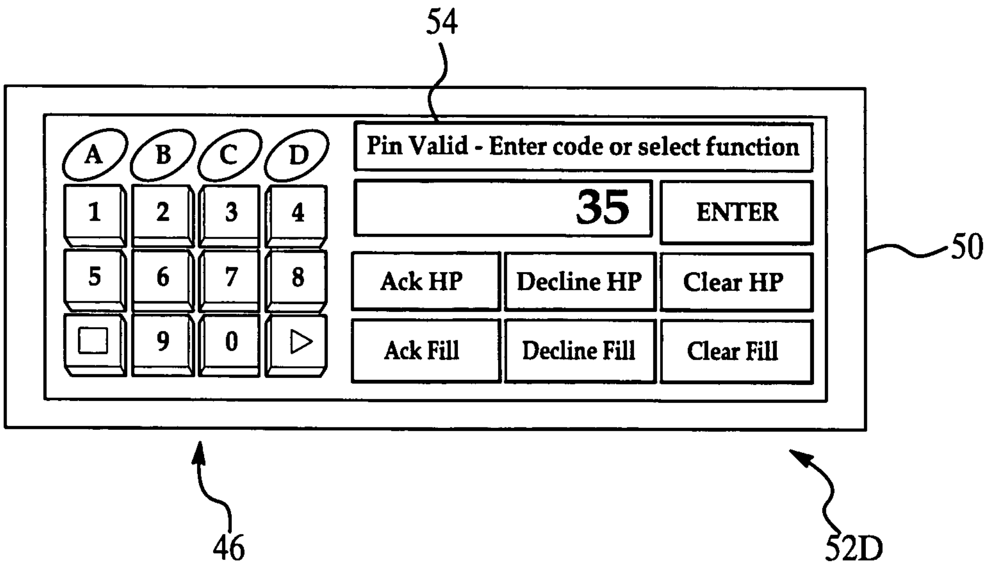
FIG. 3D is a diagrammatic illustration of a user interface, according to an embodiment of the present invention.

With reference to FIG. 3D, in a further aspect of the present invention, the player tracking device 38 may alert a technician in response to an error condition of the gaming machine 12. The player tracking device identifies the technician by an ID card inserted into the ID card reader and/or an identification number entered on the keypad 46. In one embodiment, the tracking device 38 may display technical instructions, e.g., repair instructions, or debugging information to the slot technician. The technical instructions or debugging information may be in the form of text, video, and/or audio.

In another embodiment, the keypad 46 may be used for entering repair or verification codes by user. With specific reference to FIG. 3D, the keypad 46 may be used to enter verification codes related to hopper fills or jackpot fills.

In one embodiment, the verification codes relate to the gaming machine 12 which is coupled to the player tracking device 38 on which the code is entered. In another embodiment, a verification code may be related to another of the gaming machines 12.

One suitable player tracking device is disclosed in U.S. patent application Ser. No. 10/661,128 filed Sep. 12, 2003, which is hereby incorporated by reference.

Returning to FIG. 1, the present invention may also provide a remote system 48 for use with the gaming system 14. The remote system 48 provides access to various features or functions of the gaming system 14 by one or more remote devices 50.

In the illustrated embodiment, there are four remote devices 50A, 50B, 50C, SOD, however, this is for discussion purposes only. Any number of remotes devices 50 may be included.

The remote devices 50 are connected to the network 16 through a network link 52. In one aspect of the present invention, the network link 52 is a wireless connection. In one embodiment, the wireless connection uses the IEEE 802.11 standard, e.g., 802.11b or 802.11g. However, it should be noted that wireless links using other standards may also be used where appropriate, such as a short range radio link (e.g., a link using the technology known as "Blue Tooth"). In another aspect of the present invention, the network link 52 may be a wire link.

The remote devices 50 are generally used by a user 54 and provides, as discussed below, access to various data and/or functions of the gaming system 14.

In one aspect, the user 54 is an employee of the gaming established where the gaming system 14 is operating. Typically, the user 54 has an assigned role (or type) based on their job description. Typical roles may include, but are not limited to, system administrator, supervisor, pit, pit manager, slot floor employee, patron host, player's club, security, security supervisor, slot attendant, slot director, slot shift supervisor, slot technician, sports and race book, surveillance, and table supervisor.

In one embodiment of the present invention, the remote devices 50 provides access to one or more types of data and/or one or more functions based on the assigned role of the user 54. In one embodiment, a remote device 50 may provide access to one or more of the following functions: remote patron signup, remote patron information, remote device information, remote cash ticket processing, remote jackpot ticket processing, remote hopper fill ticket processing, remote table rating interface, remote attendance, remote surveillance, adjusting a player's bonus or comp points, issuing comp vouchers to a player, redeeming printed vouchers, listing and redeeming outstanding vouchers assigned to a player, retrieving and displaying information related to a specific remote device 50 or the system 14, and the like.

In one embodiment of the present invention, the remote devices 50 may be a mobile computer based on the PALM operating system or Microsoft Windows operating system.

A suitable remote system 48 is disclosed in the following U.S. patent applications all of which are hereby incorporated by reference: Ser. No. 10/661,392, Ser. No. 10/661,131, Ser. No. 10/661,129, Ser. No. 10/661,145, Ser. No. 10/661,140, Ser. No. 10/661,133, Ser. No. 10/660,959, Ser. No. 10/661,395, Ser. No. 10/661,391, Ser. No. 10/662,101, Ser. No. 10/661,390, Ser. No. 10/661,865, Ser. No. 10/661,233, Ser. No. 10/661,450, all filed on Sep. 12, 2003.

In one aspect of the present invention, the user interfaces 15, 17 are displayed in a (a) in a preferred language of the identified user 17 or (b) in the default language of the system 10 if no preferred language is specified.

Typically, the computer 18 or other workstation allows a predetermined user 17 to set the default language for the system 10 and/or the preferred language for the at least one user 17 (see below).

A system, as set forth in claim 6, the processor being coupled to the computer, the database containing patron information including bonus points, the player tracking device for identifyng a patron, the display for displaying to the player at least one of a bonus point total, a session bonus point total, and an available cash play.

Figure 4:
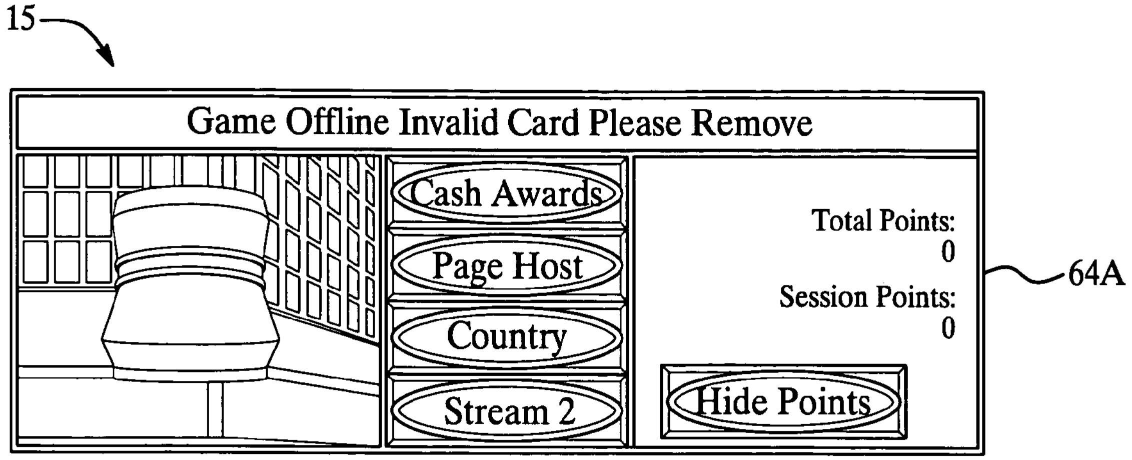
FIG. 4 is a diagrammatic illustration of a user interface in a first language, according to an embodiment of the present invention.
Figure 5:
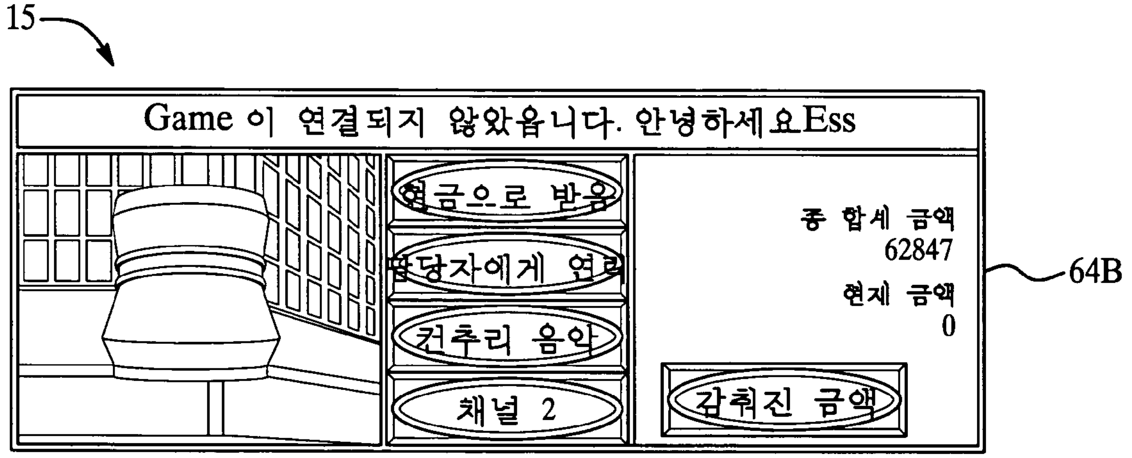
FIG. 5 is a diagrammatic illustration of the user interface of FIG. 4 in a second language, according to an embodiment of the present invention.
Figure 6:
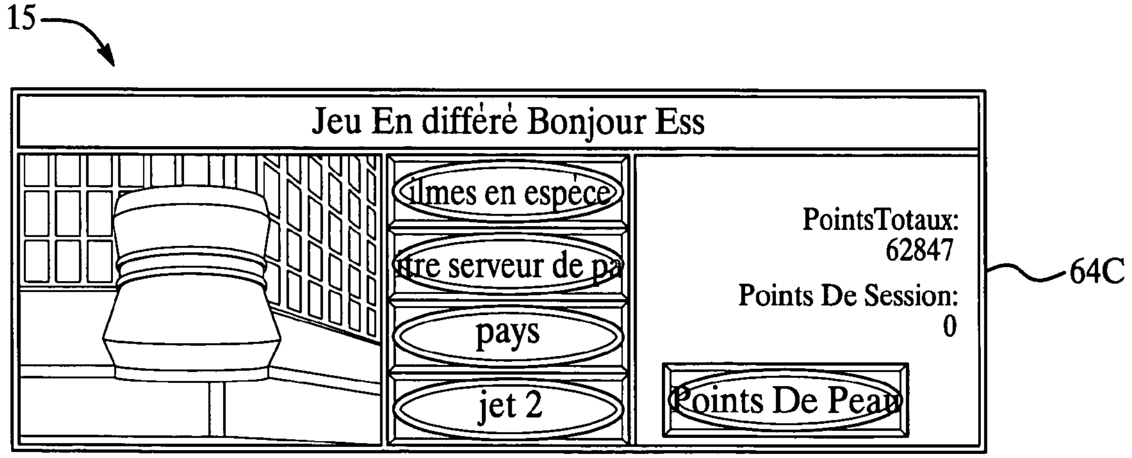
FIG. 6 is a diagrammatic illustration of the user interface of FIG. 4 in a third language, according to an embodiment of the present invention.
Figure 7:
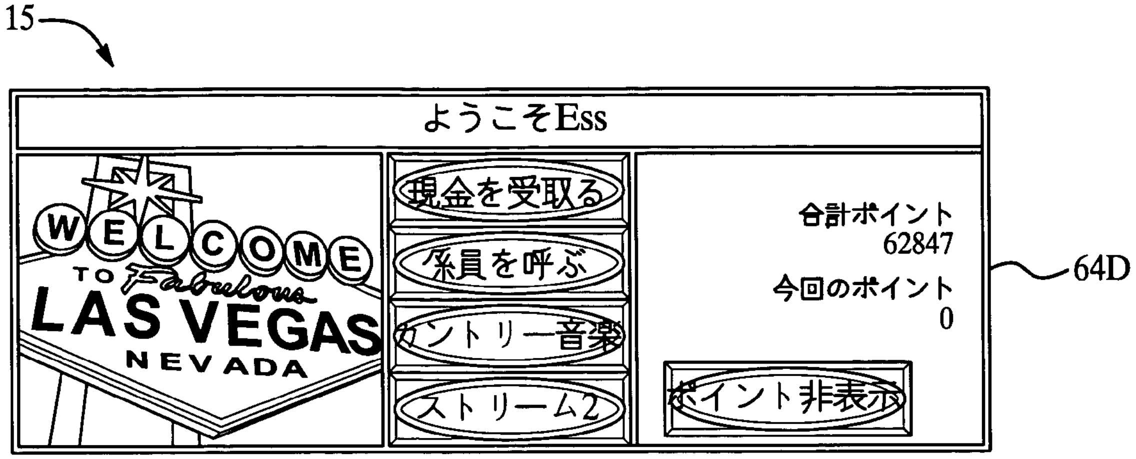
FIG. 7 is a diagrammatic illustration of the user interface of FIG. 4 in a fourth language, according to an embodiment of the present invention.

With reference to FIGS. 4-7, a portion 64A, 64B, 64C, 64D of the user interface 15, 19 is shown. In the illustrated embodiment the illustrated user interface 15, 19 is for the player tracking device 38. However, other portions of the user interfaces 15, 19 may also be displayed in different languages. With reference to FIG. 4, the portion 64A is displayed in English. With reference to FIG. 5, the portion 64B is displayed in Korean. With reference to FIG. 6, the portion 64C is displayed in French. With reference to FIG. 7, the portion 64D is displayed in Japanese. As discussed above, the language in which the user interface 15, 19 is displayed is determined by the preferred language of an identified user 17, or in the default language of the system 10, if no preferred language for an identified user 17 is available.

Figure 8:
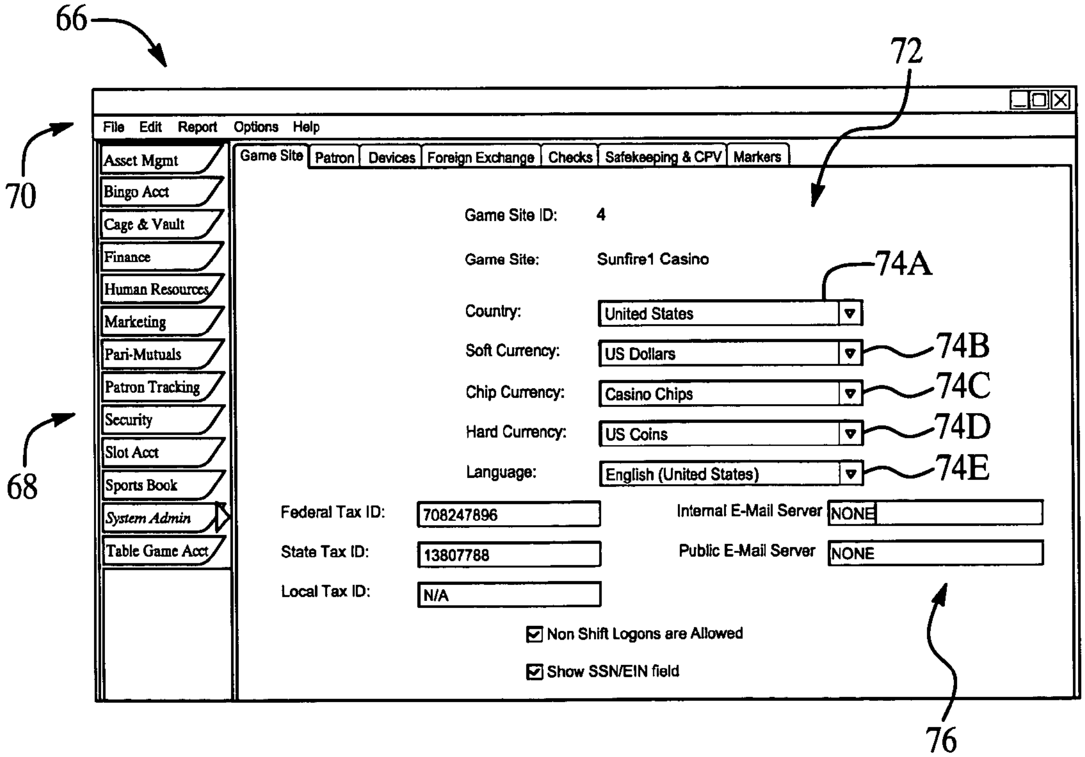
FIG. 8 is a diagrammatic illustration of a site defaults form, according to an embodiment of the present invention.
Figure 9:
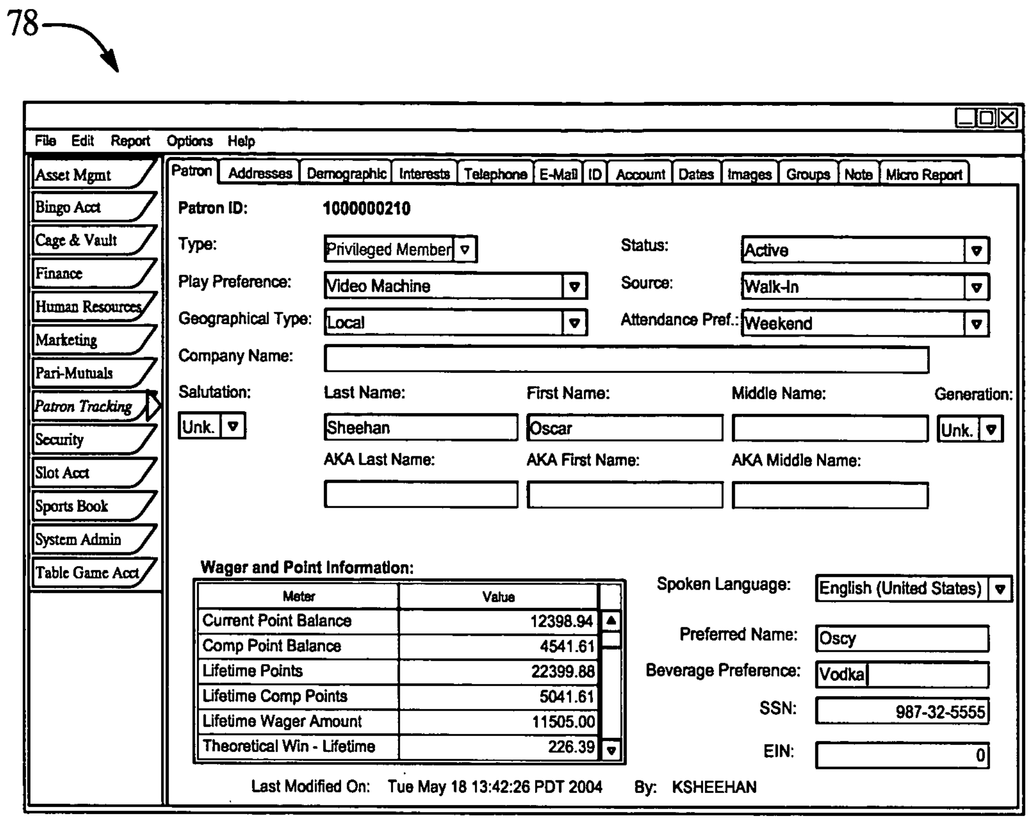
FIG. 9 is a diagrammatic illustration of a patron maintenance form, according to an embodiment of the present invention.
Figure 10:
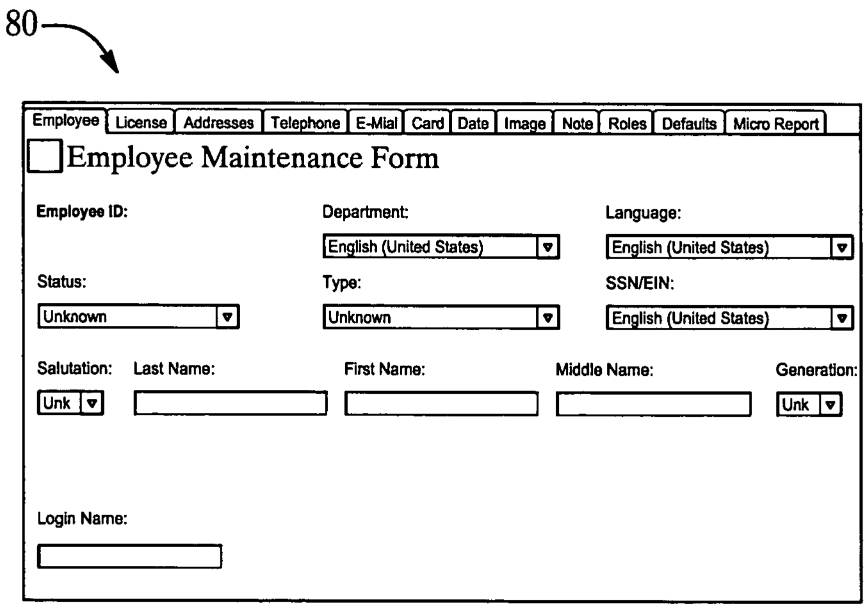
FIG. 10 is a diagrammatic illustration of an employee maintenance form, according to an embodiment of the present invention.

With reference to FIGS. 8-10, portions of the user interface 15, 19 which may be used by employee users 17 to manage and interface with the system 10 are shown. Typically, these portions of the user interface 15, 19 would be displayed or used on the computer 18 or other computers or workstations (not shown) networked to the computer 18. Although these portions (or simplified versions) may also be accessed on the remote devices 50. It should be noted that, while these portions are illustrated for the purpose of describing operation of the system 10, these portions may also be displayed in a preferred language of an identified user or in a default system language if no preferred language for the identified user has been established.

The user interface 15,19 may provide a plurality of windows or dialog boxes or other tools to provide the user 17 with the ability to manage the system 10. An exemplary window 66. In the illustrated embodiment, the window 66 includes a plurality of navigation buttons 68 along the left and a plurality of menus 70 along the left to allow the user 17 to navigate through the user interface 15. A plurality of tabbed panels 72 may also be provided (only one of which is shown). The illustrated tabbed panel 72 is the game site defaults tabbed panel. The game site defaults tabbed panel 72 may be used by the user 17 to establish the country, currency, and language for the current gaming site. In a multi-site environment, the site is the current location. In the illustrated embodiment, the game site defaults tabbed panel 72 may be used to set the country, the soft currency, the chip currency, the hard currency and the default language for the system 10 in respective drop down boxes, 74A, 74B, 74C, 74D, 74E. Other information may also be added in respective locations 76, as shown.

With specific reference to FIG. 9, in the illustrated embodiment, the patron tabbed panel 78 may be used for entering or modifying a complete player's club application. When an account is entered and saved, much of the data will be useful for marketing purposes. Although not recommended, the minimum required information to create an account is the patron last and first name. List below are the descriptions of the fields shown on the exemplary patron tabbed panel 78.

Type—The Type field is selected by the system.

Status—Select a status by clicking the down arrow and highlighting an option. Typically the status for a new patron joining a slot club is 'Active'.

Game Preference—Select an option (e.g. Video Machine, Tables, Bingo) from the drop-down list. These defaults are set up in: System Administration/Patron Setup/Play Preference.

Source—This field indicates how a patron learned of your establishment. Did they receive a club application as part of a direct mail campaign, do friends/family already belong to your players club, or are they a 'walk-in'? This data assists Marketing by breaking down the current customer base enabling them to know where to target market next and what form of solicitation will be most effective. It also indicates how effective the current marketing plan is. Click the down arrow to highlight a selection.

Geographical Type—This drop-down list helps marketing determine the geographical customer base enabling them to use this as criteria for future events and mailing campaigns. Geographical options are: Local, International, or Regional. Make a selection from the drop-down list.

Attendance Preference—To categorize a patron by attendance preference, select an option from the drop-down list. This data assists Marketing when compiling invitations lists for events/promotions. These options are set up in: System Administration/Patron Setup/Attendance Preference.

Company Name—If your property requires patron employment info, complete this field. This information is optional. *If this field is populated, the name will print on mailing labels, envelopes, etc.

Salutation—This drop-down list is used to select the salutation that will appear on mailers. Select an option from the drop-down list.

Last Name/First Name/Middle Name—Enter each name in the appropriate field.

Generation—If the patron's name includes a generation, such as Sr. or Jr., select it from the drop-down list.

AKA Last Name/First Name/Middle Name—If the patron uses an AKA, enter it in these fields. When doing a name search, the AKA can be used and will locate the account in the same manner as the primary name.

Spoken or Preferred Language—Select the language of the patron from the drop-down list.

Preferred Name—Use alpha characters only. If a patron prefers to be addressed by a nickname (e.g. Bobby instead of Robert), enter that as the preferred name. When their player's card is used in a machine, the display will greet them using the preferred name.

With particular reference to FIG. 10, an employee tabbed panel 80 is shown. The employee tabbed panel 80 may be used to insert, edit, or inactivate an employee account. Below are descriptions of the fields to be completed.

Department—Displays department titles for the property. This field can be edited if an employee transfers to another department.

Language—Defaults to the country set up for your system. (Optional)

Status—Active, inactive, unknown. This field describes the current account and/or employment status.

Type—Describes the employee's actual job title/position.

SSN/EIN—Social security or employee ID number.

Salutation—Salutation helps to properly address employee mail. (Optional)

Last/First/Middle Name—Enter the employee name (middle name optional). Locate existing accounts using EDIT/FIND or CTRL+F. For help using 'Find', go to: System Search Using Find.

Generation—Legal names often include Jr., Sr., 3rd, etc. (Optional)

Login Name—Login name the new user will enter to gain system access.

Modified On & By—Displays date/time of the last change made to the form as well as the ID of the user responsible for the change.

Obviously, many modifications and variations of the present invention are possible in light of the above teachings. The invention may be practiced otherwise than as specifically described within the scope of the appended claims.

What is claimed is:

1. A system for managing electronic gaming environments including a plurality of gaming devices, each gaming device having a gaming device display, comprising:

a plurality of player tracking devices, each player tracking device being associated with, and coupled to a respective gaming device, each player tracking device having a player tracking display which, at least partly implements a user interface, the user interface of the player tracking device for identifying a user from a plurality of users, interacting with the user, and providing access to the system as a function of the identity of the user, the player tracking device display being separate from the gaming device display, the plurality of users including a plurality of players and a plurality of employees;

a plurality of remote devices being located within the electronic gaming environment and having a user interface of the remote device, the user interface of the remote device being configured to identify an employee from the plurality of employees, interacting with the employee and providing access to various data and functions of the system to the employee as a function of an assigned role of the employee;

a database configured to store system and user account data for the users, the database including a default language associated with the gaming environments, at least one user account including data indicative of a preferred language associated with a user;

a computer coupled to the database and networked to each player tracking device corresponding to each gaming machine, wherein a user may select any one of the player tracking devices, and independent of the selected player tracking device and associated gaming device, the computer configured to:

receive a user ID associated with the user, identify a user account associated with the received user ID, and determine if the identified user account includes a preferred language;

display the user interface of the player tracking device on the player tracking display of the selected player device: (a) in the preferred language of the identified user; or (b) in the default language of the corresponding gaming environment if no preferred language is specified for the user, the computer being wirelessly networked to each of the remote devices;

display the user interface of the remote device: (a) in a preferred language of the identified employee; or (b) in the default language of the corresponding gaming environment if no preferred language is specified for the employee; and determine if the user is a predetermined user as a function of the identified user account and allow the predetermined user to set a preferred language associated with a different user.

2. A system, as set forth in claim 1, wherein the system is configured to monitor a first gaming environment including a first set of gaming devices and a second gaming environment including a second set of gaming devices, the computer configured to allow the predetermined user to set a different default language for each of the first and the second gaming environments.

3. A system, as set forth in claim 1, wherein the gaming device is a gaming machine for allowing a player to place a wager on a game played on the gaming device.

4. A system, as set forth in claim 3, wherein the gaming machine is a virtual gaming machine, an interface to a table management system, a kiosk or a points of sale or redemption terminal.

5. A system, as set forth in claim 1, the player tracking device including: a processor; an ID Card reader coupled to the processor; a display coupled to the processor for displaying a bezel and information to the player, the information being displayed within the bezel; and, a keypad coupled to the processor for receiving input from the player, the processor instructing the display to display instructions for inserting a player ID Card into the ID Card reader.

6. A system, as set forth in claim 5, the display being a touch-screen display.

7. A system, as set forth in claim 6, the keypad being implemented by the touch-screen display.

8. A system, as set forth in claim 5, the processor being coupled to the computer, the database containing patron information including bonus points, the player tracking device for identifying a patron, the display for displaying to the player at least one of a bonus point total, a session bonus point total, and an available cash play.

9. A system, as set forth in claim 1, the user being an employee, the user interface for allowing the employee to perform functions related to the gaming device.

10. A system, as set forth in claim 9, the user being a player, the user interface for allowing the player to access their user account data.

11. A system, as set forth in claim 1, the computer for allowing the predetermined user to establish the default language of the gaming environments.

12. A system, as set forth in claim 1, wherein the computer provides one or more of the following functions: bonus jackpots, slot accounting, player tracking, cage credit and vault, sports book data collection, point of sale (POS) accounting, Keno accounting, bingo accounting, table game accounting, progressive jackpots, and electronic funds transfer.

13. A system, as set forth in claim 1, wherein the gaming device is a remote device.

14. A method for managing electronic gaming environments, the electronic gaming environments including a plurality of gaming devices, each gaming device having a gaming device display, comprising:

storing a plurality of user accounts in a database, at least one user account of the plurality of user accounts including data indicative of a preferred language associated with a user;

providing a plurality of player tracking devices, each player tracking device being associated with, and being coupled to, a respective gaming device, each player tracking device having a player tracking display, the player tracking display being separate from the gaming device display;

establishing a default language for the electronic gaming environments in a database, the database being accessible via a computer, the player tracking devices being networked to the computer;

allowing a user from a plurality of users to select any one of the player tracking devices and identifying the user of the at least one gaming device, the plurality of users including a plurality of players and a plurality of employees;

providing a user interface at each player tracking device for interaction with the user, the user interface of the player tracking device at least partly implemented by the player tracking device;

receiving, from the selected player tracking device, a signal indicative of a user ID;

identifying a user account associated with the received user ID;

determining if the identified user account includes a preferred language;

displaying the user interface of the player tracking device: (a) in the preferred language of the identified user; or (b) in the default language of the corresponding gaming environment if no preferred language is specified;

determining if the user is a predetermined user as a function of the identified user account and responsively allowing the predetermined user to set a preferred language associated with a different user;

providing a plurality of remote devices being located within the electronic gaming environment and being wirelessly networked to the computer; and providing a user interface at each remote device, the user interface of the remote device being configured to identify an employee from the plurality of employees, interacting with the employee and providing access to various data and functions of the system to the employee as a function of an assigned role of the employee, the user interface of the remote device is displayed: (a) in a preferred language of the identified employee; or (b) in the default language of the corresponding gaming environment if no preferred language is specified.

15. A method, as set forth in claim 14, including the step of allowing the predetermined user to establish a default language for a first gaming environment; and allowing the predetermined user to establish a different default language for a second gaming environment.

16. A method, as set forth in claim 14, including the step of allowing the predetermined user to set at least one of the default language for the corresponding gaming environment and the preferred language for the at least one user.

17. A method, as set forth in claim 16, wherein the gaming machine includes a player tracking device, the method including the step of implementing the user interface on the player tracking device.

18. A method, as set forth in claim 17, the player tracking device including a processor, an ID Card reader coupled to the processor, a display coupled to the processor for displaying information to the player, and a keypad coupled to the processor for receiving input from the player.

19. A method, as set forth in claim 17, the display being a touch-screen display, the method including the step of implementing the keypad on the touch-screen display.

20. A method, as set forth in claim 14, wherein the gaming device is a gaming machine, the method including the step of allowing a player to place a wager on a game played on the gaming machine.

21. A method, as set forth in claim 20, the gaming machine is one of an electronic gaming machine, a virtual gaming machine, an interface to a table management system, a kiosk or a points of sale or redemption terminal.

22. A method, as set forth in claim 14, the user being an employee, the method including the step of allowing the employee to perform functions related to at least one of the gaming device and gaming environment through the user interface.

23. A method, as set forth in claim 14, the user being a player, the method including the step of allowing the player to access their user account data using the user interface.

24. A method, as set forth in claim 14, wherein the user interface is embodied in a remote device.

* * * * *